United States Patent
Stiner et al.

(10) Patent No.: US 7,225,102 B2
(45) Date of Patent: *May 29, 2007

(54) REEL MECHANISM WITH WATERTIGHT ELECTRONICS MODULE

(75) Inventors: Roy E. Stiner, Owasso, OK (US); Randy A. Atherton, Tulsa, OK (US); Micah Jones, Tulsa, OK (US); Curtis Schmidt, Tulsa, OK (US); Jonathan Torkelson, Tulsa, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/988,171

(22) Filed: Nov. 12, 2004

(65) Prior Publication Data

US 2005/0133650 A1  Jun. 23, 2005

Related U.S. Application Data

(63) Continuation-in-part of application No. 10/614,695, filed on Jul. 7, 2003, now abandoned, which is a continuation of application No. 09/843,525, filed on Apr. 27, 2001, now Pat. No. 6,591,222.

(51) Int. Cl.
*G06F 15/00* (2006.01)
(52) U.S. Cl. .................. 702/173; 702/130; 702/138
(58) Field of Classification Search .............. 702/137, 702/173, 130, 138
See application file for complete search history.

(56) References Cited

U.S. PATENT DOCUMENTS

| | | | |
|---|---|---|---|
| 3,246,859 A | 4/1966 | Martin | 242/84.54 |
| 4,422,258 A | 12/1983 | Adams et al. | 43/17 |
| 4,516,348 A | 5/1985 | Hirose et al. | 43/17 |
| 4,552,318 A | 11/1985 | Durham | 242/84.1 |
| 4,650,161 A | 3/1987 | Kaneko | 242/84.5 |
| 4,693,125 A | 9/1987 | Krutz et al. | 73/862.39 |
| 4,782,617 A * | 11/1988 | Peikin | 43/18.1 R |
| 4,840,327 A | 6/1989 | Kaneko | 242/217 |
| 5,007,601 A * | 4/1991 | Emura et al. | 242/223 |
| 5,219,131 A | 6/1993 | Furomoto | 242/223 |
| 5,243,147 A | 9/1993 | Johnson | 177/245 |
| 5,321,903 A | 6/1994 | Ebener | 43/17 |
| 5,479,831 A | 1/1996 | Hirose | 73/862.44 |
| 5,560,560 A | 10/1996 | Hirose | 242/223 |
| 5,639,038 A | 6/1997 | Hirose | 242/223 |
| 5,752,461 A * | 5/1998 | Whisenhunt | 114/253 |
| 5,782,033 A | 7/1998 | Park et al. | 43/4 |

(Continued)

FOREIGN PATENT DOCUMENTS

DE  3644165 A1  7/1988

(Continued)

*Primary Examiner*—John Barlow
*Assistant Examiner*—Douglas N Washburn
(74) *Attorney, Agent, or Firm*—Fellers, Snider, Blankenship, Bailey & Tippens

(57) ABSTRACT

A fishing reel with an electronics module enclosed by an exterior housing of the fishing reel is disclosed. The electronics module provides a watertight environment for a plurality of circuits. The circuits are useful to perform a variety of functions, including but not limited to determining a status of a fishing environment, controlling reel functions, or otherwise.

23 Claims, 5 Drawing Sheets

U.S. PATENT DOCUMENTS

| | | | |
|---|---|---|---|
| 5,833,156 A | 11/1998 | Park et al. | 242/289 |
| 5,894,691 A | 4/1999 | Zepeda, Sr. | 43/17 |
| 6,126,103 A | 10/2000 | Nanbu | 242/223 |
| 6,312,335 B1 | 11/2001 | Tosaki et al. | 463/37 |
| 6,591,222 B2 | 7/2003 | Stiner | 702/173 |
| 2004/0056131 A1 | 3/2004 | Stiner et al. | 242/223 |
| 2005/0161543 A1* | 7/2005 | Stiner et al. | 242/223 |

FOREIGN PATENT DOCUMENTS

| | | |
|---|---|---|
| JP | 05030883 A | 2/1993 |
| JP | 05161438 A | 6/1993 |
| JP | 05184271 A | 7/1993 |

* cited by examiner

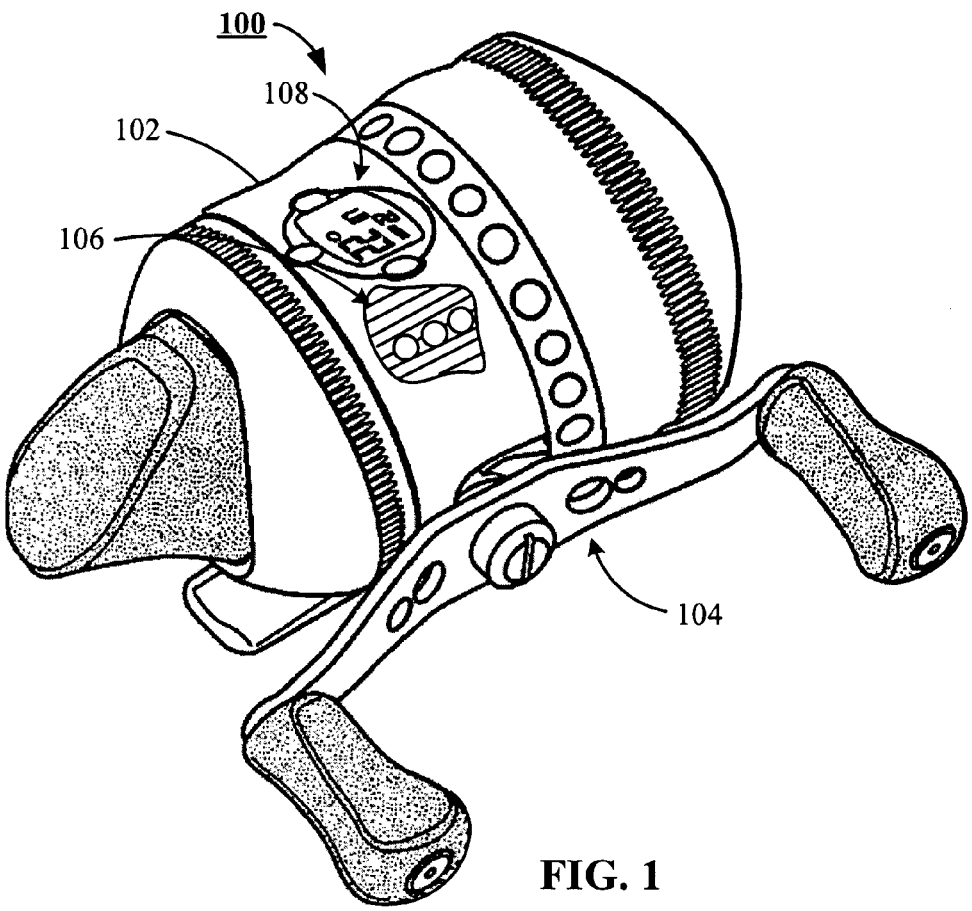
FIG. 1
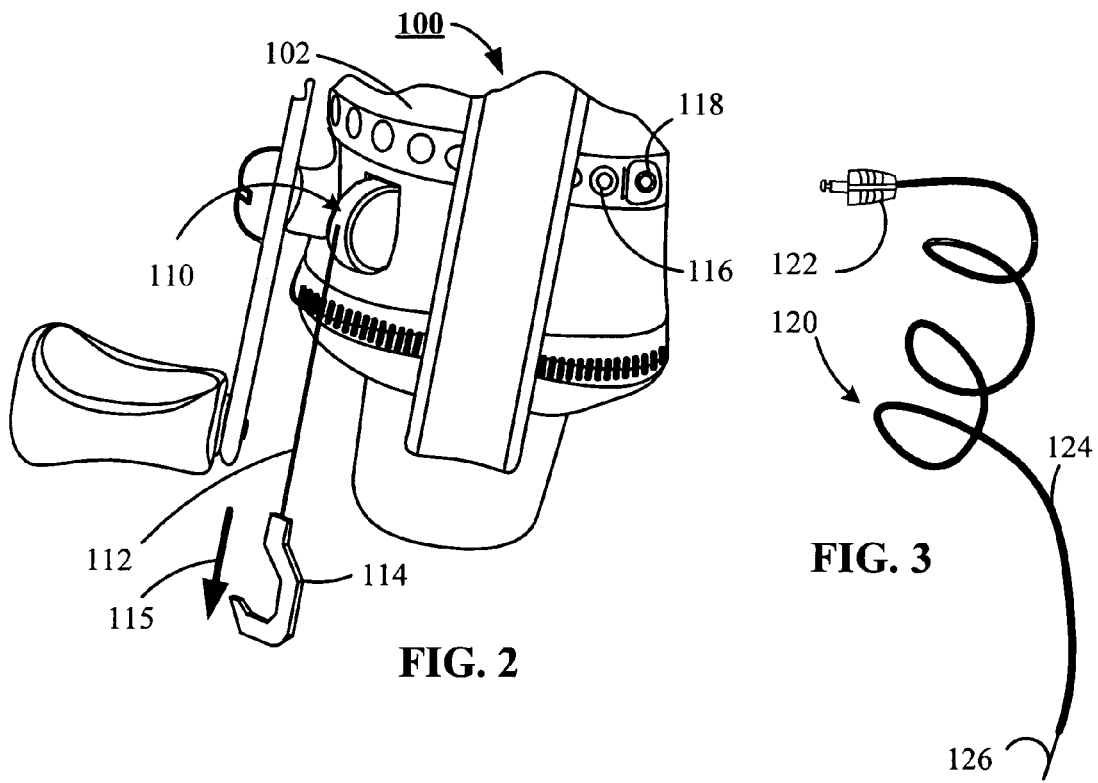
FIG. 2
FIG. 3

REEL MECHANISM WITH WATERTIGHT ELECTRONICS MODULE

CROSS REFERENCE TO RELATED APPLICATION

This application is a continuation-in-part (CIP) of and claims the benefit of U.S. patent application Ser. No. 10/614,695 entitled REEL MECHANISM WITH LINE TENSION/FISH WEIGHT INDICATOR filed Jul. 7, 2003 now abandoned which is a continuation of U.S. patent application Ser. No. 09/843,525 entitled REEL MECHANISM WITH LINE TENSION/FISH WEIGHT INDICATOR filed Apr. 27, 2001 which issued into U.S. Pat. No. 6,591,222 on Jul. 8, 2003.

BACKGROUND OF THE INVENTION

1. Field of the Invention

This invention relates generally to a fishing reel. More particularly, but not by way of limitation, the present invention relates to a fishing reel, which incorporates an electronics module that includes an electronics enclosure, in which the electronics module provides a watertight environment for a plurality of circuits which are usable to determine a status of a fishing environment, control reel functions, or otherwise.

2. Background

Fishing reels for sport fishing are known in the art and are available in a variety of styles such as bait casting reels, spin casting reels, spinning reels, fly fishing reels, etc. Such reels are available with a wide variety of features which enhance the fishing experience. For example, most reels provide an adjustable drag mechanism whereby an angler may set a force level so that the reel will resist forces below the drag force, but will allow the fishing line to payout when forces exceeding the drag force are encountered. The adjustable drag mechanism thus reduces the likelihood that a large fish will break the fishing line or damage the reel.

Generally speaking, it would be desirable for an angler to determine the status of the fishing environment in real time. Changes in the fishing environment over time, or in location on the body of water being fished, can alter the fishing strategy being employed by the angler. For example, it is not necessarily known why fish feed more during times of changing barometric pressure. However, experienced anglers have reported that more fish were caught when the barometric pressure was relatively steady (but typically not above 30.40 inches or so), rising steadily, or fluctuating rapidly (such as when rain storms come and go). Reportedly, when a weather front is approaching (falling barometer), fish are not as likely to bite. The same thing is true when a weather front is clearing, but not as drastic. But immediately following the passing of the front, as the barometer rises, the fish feed very aggressively and will continue to feed until the barometer begins to fall.

Another example of a real time status of a fishing environment valuable to an angler would be knowledge of an estimated weight of a fish, while the fish is being reeled in. Such knowledge is desirable for a number of practical considerations as well as satisfying the curiosity of the angler. For example, if the force at which the fish is pulling on the fishing line exceeds the tensile strength of the fishing line, the angler would be able to lighten the drag rather than risk a broken fishing line. Additionally, knowledge of the approximate size of the fish, while reeling the fish in, would increase the excitement of landing the fish.

Standalone measurement devices such as fish scales, hand held barometers, and temperature measure devices are known in the art. However, market pressures continue to push for competitive products that enhance the fishing experience of anglers in a more efficient and ergonomically convenient manner. Minimizing the number of auxiliary devices carried by an angler, and minimizing time needed by the angler for operating those auxiliary devices is likely to enhance the angler's fishing experience. As such, challenges remain and a need persists for improvements in devices and methods for collecting and displaying data pertinent to anglers for promoting successful fishing experiences, to which the present invention is directed.

SUMMARY OF THE INVENTION

The present invention preferably provides a fishing reel including, an exterior housing enclosing an electronics module. The electronics module includes a casing that preferably provides a watertight environment for a plurality of circuits. The circuits are useful to perform a variety of functions, including but not limited to determining a status of a fishing environment, controlling reel functions, or otherwise.

In a preferred embodiment, the plurality of circuits include at least: a circuit for estimating a weight of a fish while the fish is being reeled in; a circuit for sensing barometric pressure of a fishing environment; a circuit for sensing temperature of a body of water of the fishing environment; a circuit for sensing the landed weight of the fish; and a display device. The display device preferably and selectively presents a measurement indicative of: the estimated weight of the fish prior to an actual landing of the fish, or the barometric pressure of the fishing environment; or the temperature of the body of the fishing environment; or the weight of the successfully landed fish.

In another preferred embodiment, a status of the fishing environment is determined by steps that include at least: determining a temperature value of the body of water of the fishing environment based on a response of a thermal-couple communicating with a temperature measurement circuit of the electronics module, and immersed in the body of water; and determining a barometric pressure value of the fishing environment based on a response of a barometric pressure measurement circuit of the electronics module to an atmospheric sample of the fishing environment.

Preferably the steps further include at least: estimating a projected weight value of the fish interacting with a fishing line of the fishing reel based on a change in load applied to the fishing line by a fish while the fish is being reeled in, wherein a change in load applied to the fishing line is analyzed by a dynamic load measurement circuit of the electronics module; calculating a weight value of the successfully landed fish based on a response of a weight measurement circuit of the electronics module responding to suspension of the landed fish from an electronic scale portion of the weight measurement circuit; and selectively displaying the temperature value, the barometric pressure value, the projected weight value, or the weight value on a display of the electronics module.

These and various other features and advantages, which characterize the present invention, will be apparent from a reading of the following detailed description and a review of the associated drawings.

BRIEF DESCRIPTION OF THE DRAWINGS

FIG. 1 provides a partial cutaway top side perspective view of a preferred embodiment of the present inventive fishing reel.

FIG. 2 provides a partial cutaway bottom side elevational view of the preferred embodiment of the inventive fishing reel of FIG. 1.

FIG. 3 provides an elevational view of a thermal-couple attachment of the inventive fishing reel of FIG. 1.

DETAILED DESCRIPTION OF THE PREFERRED EMBODIMENT

Figure 4:
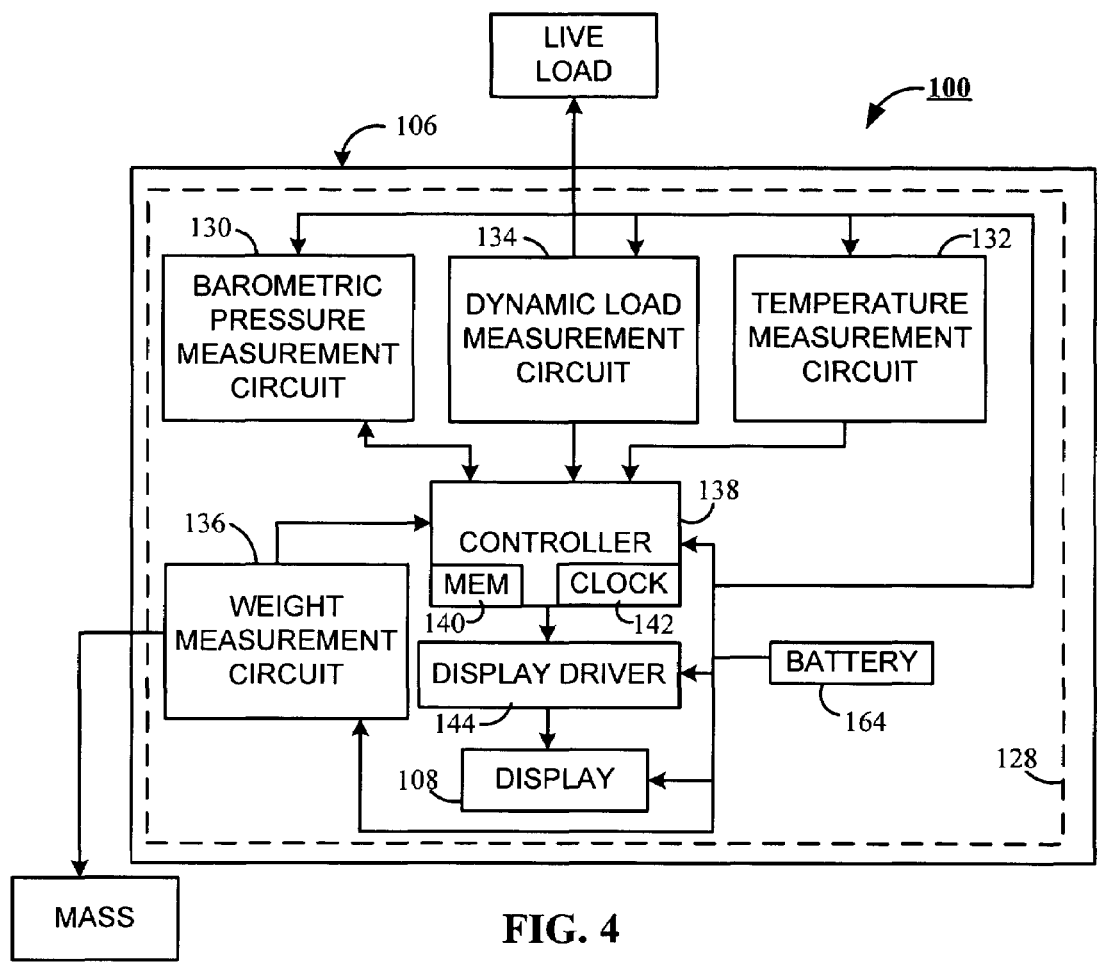
FIG. 4 provides a functional block diagram of a preferred watertight electronics module for use with the inventive fishing reel of FIG. 1.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation. Additionally, the term "fishing environment" as used herein below shall mean: a body of water supporting a fish; and the atmosphere adjacent the body of water; and a fish on a fishing line prior to landing the fish; and a landed fish. The term "landed fish," as used herein below shall have the meaning of: a fish extracted from a body of water and under complete control of an angler.

Referring now to the drawings, wherein like reference numerals indicate the same parts throughout the several views, a preferred embodiment of inventive fishing reel 100 of FIG. 1 includes: an exterior housing 102; a crank handle 104 located adjacent the exterior housing 102 for rewinding the fishing line; a watertight electronics module 106 enclosed by the exterior housing 102; and a display 108 for displaying data collected pertinent to a fishing environment of interest. The display 108 is typically a liquid crystal display; however, a number of suitable display types are available such as LED displays, or vacuum fluorescent displays, etc.

As shown by FIG. 2, the fishing reel 100 includes: a weight suspension portion, such as a coil spring mechanism 110, of a force transfer mechanism (not separately shown) adjacent the crank handle 104. Preferably, the coil spring mechanism 110 provides a retractable weigh line 112 supporting a weigh hook 114 for weighing landed fish. During a weighing process of a landed fish, compensation for an amount of force needed to uncoil and suspend the retractable weigh line 112 with the weigh hook 114 from the fishing reel 100 is made by a fish weighing portion of a control program executed by a controller (shown in FIG. 4), which is enclosed within the watertight electronics module 106.

The fishing reel 100 shown by FIG. 2 further includes a thermal-couple input receptacle 116 supported by the exterior housing 102, the thermal-couple input receptacle 116 cooperates with a thermal-couple (shown by FIG. 3) to provide a temperature measurement circuit (shown in FIG. 4), a signal indicative of a temperature of a body of water of the fishing environment of interest; and a thermal-couple input receptacle cover 118 supported by the exterior housing 102, and hinged adjacent the thermal-couple input receptacle 116. The thermal-couple input receptacle cover 118 seals the thermal-couple input receptacle 116 from exposure to the elements, when the thermal-couple input receptacle 116 is in nonuse.

FIG. 3 shows a thermal-couple 120 that included at least a thermal-couple input jack 122 at a proximal end of a conductor 124, and a thermal probe 126 at a distal end of the conductor 124. The thermal-couple input jack 122 communicates with the thermal-couple input receptacle 116 of FIG. 2, while the thermal probe 126 communicates with a fluid, preferably a body of water of interest to an angler, during a fluid temperature measurement process.

Referring next to FIG. 4, the fishing reel 100 shows the watertight electronics module 106, which includes an electronics enclosure 128, the electronics enclosure 128 provides a watertight environment for a plurality of electronic circuits. Included among the plurality of electronic circuits housed by the electronics enclosure 128 are: a barometric pressure measurement circuit 130; a temperature measurement circuit 132; a dynamic load measurement circuit 134 for use in estimating a weight of a fish while the fish is being reeled in; and a weight measurement circuit 136 for measuring the weight of the fish after landing the fish, each communicating with a controller 138. The controller 138, includes a memory portion (MEM) 140 and a clock portion 142. FIG. 4 further shows that the controller 138 communicates with a display driver 144, which translates acquired information stored in the MEM 140, and supplies the translation to the display 108.

Figure 5:
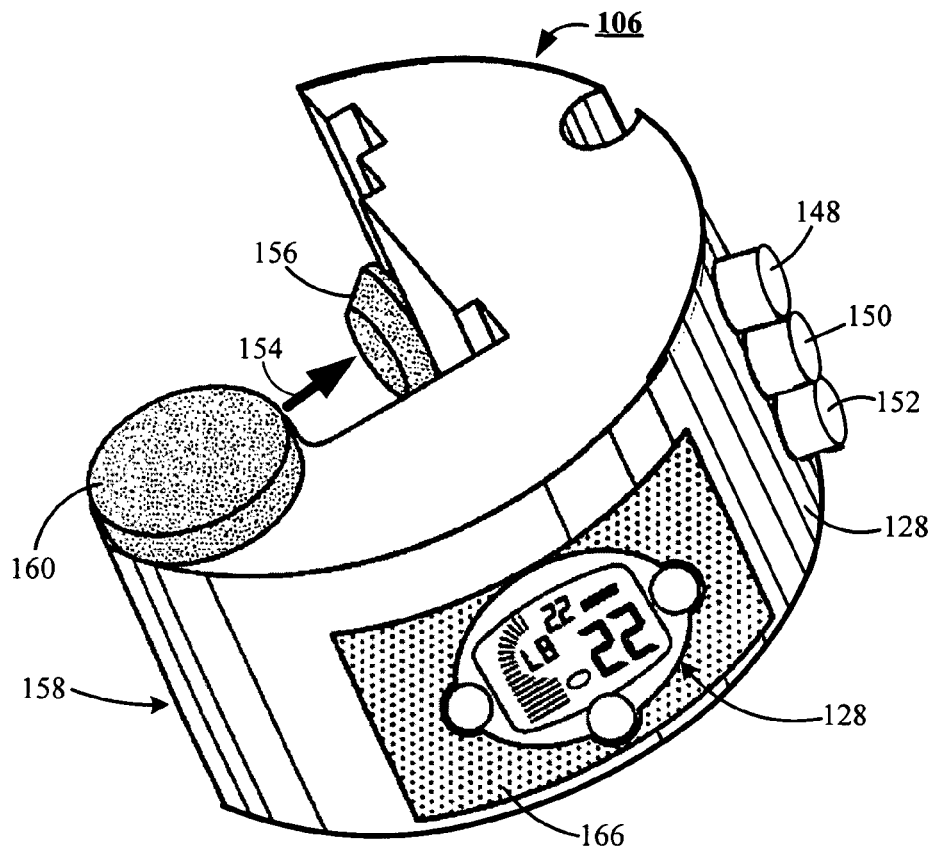
FIG. 5 provides a top perspective view of a preferred embodiment of the watertight electronics module of FIG. 4.

Referencing FIGS. 4 and 5, during operation of the fishing reel 100, of FIG. 1; an angler may optionally depress a barometric switch 148 to commence barometric pressure readings. Having depressed the barometric switch 148, the controller 138 signals the barometric pressure measurement circuit 130 to acquire an initial barometric pressure reading. The barometric pressure measurement circuit 130 acquires a current reading of the barometric pressure, and reports the current reading to the controller 138. In a preferred embodiment, the controller 138 stores the current reading of the barometric pressure in the MEM 140 and executes a barometric pressure acquisition routine (not shown separately).

Figure 8:
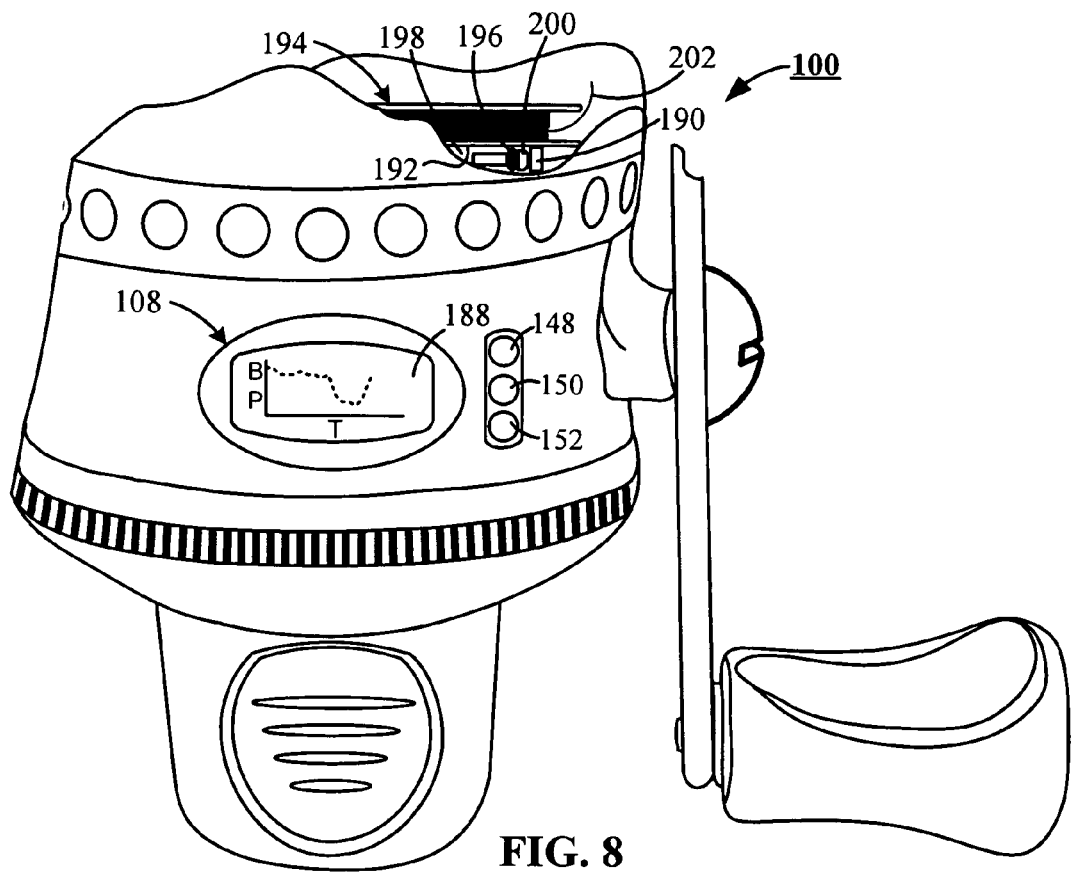
FIG. 8 provides a partial cutaway front side elevational view of a first alternate preferred embodiment of the inventive fishing reel of FIG. 1.

Referencing the clock portion 142, the barometric pressure acquisition routine will cause the controller 138 to activate the barometric pressure measurement circuit 130 to acquire an additional barometric pressure reading following a predetermined period of time. That is, a predetermined period of time from the acquisition of the first barometric pressure reading. For example, 15 minutes may be the predetermined period of time. In other words, at each subsequent 15 minute time interval, an additional barometric pressure reading will be made and stored in the MEM 140. Preferably, at anytime following the acquisition of at least two barometric pressure readings, the angler may selectively view either the most recently acquired barometric pressure value reading, or a graphical representation of all of the then acquired barometric pressure readings (as shown by FIG. 8). By depressing a display activation switch 150, a predetermined number of times, the angler may view either the current reading or the graphical representation. In a preferred embodiment, the MEM 140 will store a predetermined number of the most recently acquired barometric pressure readings, for example, the last 20 readings.

After plugging in the thermal-couple input jack 122 of the thermal-couple 120 (each of FIG. 3) into the thermal-couple input receptacle 116, of FIG. 2, of the fishing reel 100, the angler may depress a temperature switch 152 of the electronics module 106 to commence temperature readings, preferably of a body of water of the fishing environment of interest to the angler. Following depression of the temperature switch 152 by the angler, the controller 138 waits for a signal generated by the thermal probe 126. Upon detection of the signal, the controller 138 translates the signal into a temperature value, and stores the determined temperature in the MEM 140.

Figure 9:
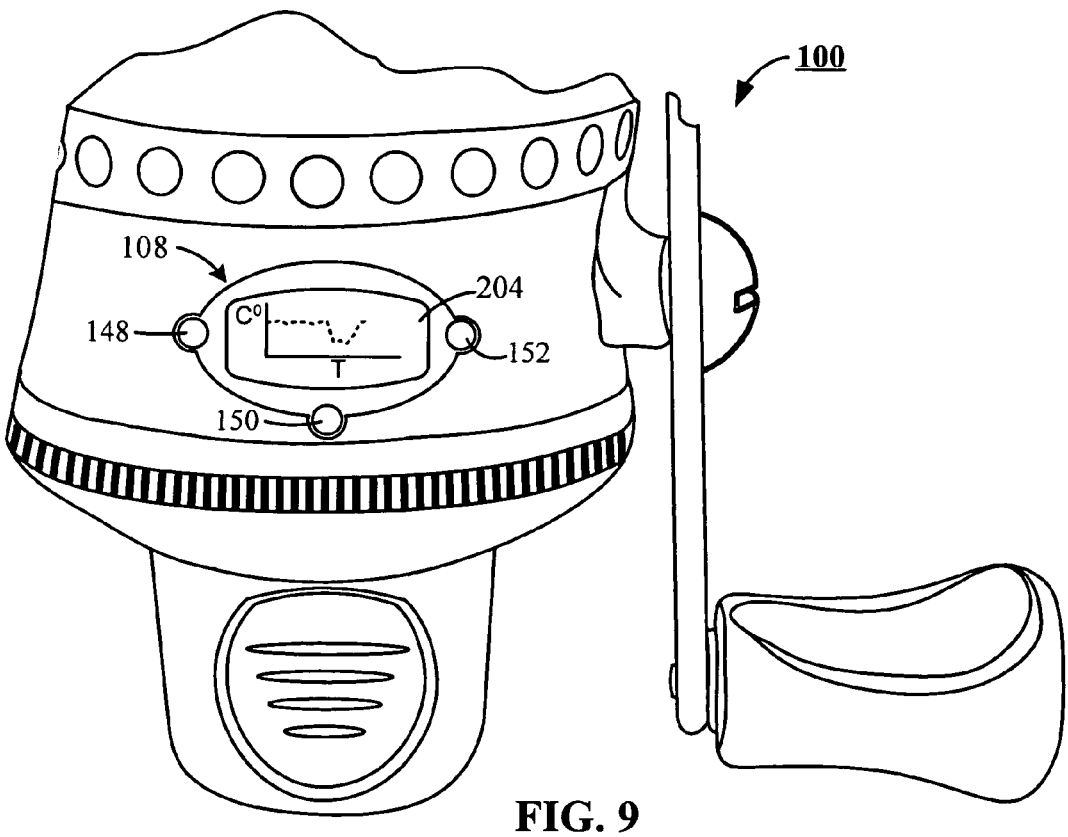
FIG. 9 provides a partial cutaway front side elevational view of a second alternate preferred embodiment of the inventive fishing reel of FIG. 1.

Preferably, at anytime following the acquisition of at least two temperature values, the angler may view either the most recently acquired temperature value, or a graphical representation of all temperature values acquired to that point (as shown by FIG. 9). By depressing the display activation switch 150, a predetermined number of times, the angler may view either the current reading or the graphical representation. In a preferred embodiment, the MEM 140 will store a predetermined number of the most recently acquired temperature values, for example, the last 20 readings. It is noted that, preferably, by depressing the display activation switch 150 a predetermined number of times, the display 108 will query the angler whether the angler wishes to discontinue data collection and shut down the electronic circuits of the fishing reel 100. If the angler wishes to discontinue data collection the angler may do so by simultaneously pressing the barometric switch 148, and the temperature switch 152. Upon shutting down the barometric pressure and temperature circuits of the fishing reel 100, any data stored in the MEM 140 related to either temperature or barometric pressure readings are erased.

Figure 6:
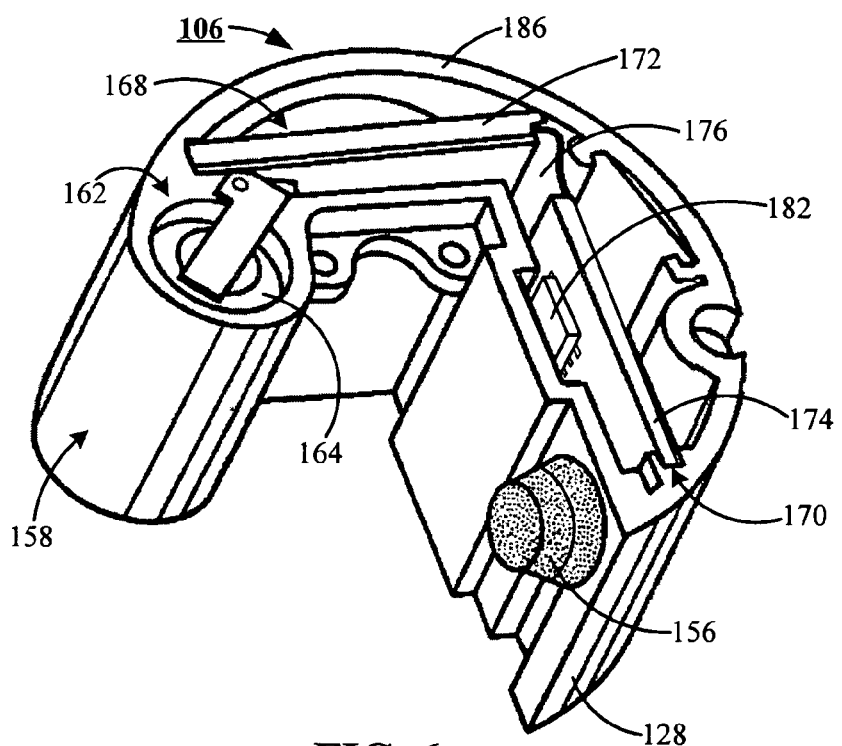
FIG. 6 provides a partial cutaway bottom perspective view of a preferred embodiment of the watertight electronics module of FIG. 5.

With reference to FIGS. 4, 5, and 6, the MEM 140 preferably provides memory space for a plurality of species specific files (not separately shown). Each species specific file contains a species response formula, and accommodates storage of information gathered by the dynamic load measurement circuit 134 while the angler is landing a fish. In the preferred embodiment, the species response formula is a mathematical relationship, which preferably relates a given combination of forces (i.e., hook-set force, peak force encountered while landing the fish, an average constant force encountered while reeling the fish in) to the weight of the fish. In such an embodiment, fish would be caught using the fishing reel 100 adapted with the dynamic load measurement circuit 134 configured to gather the forces encountered in the act of landing the fish. Hook-set, peak, and constant forces would then be plotted against fish weight and conventional methods would be used to find an equation which "best fits" the plot. Best fit algorithms are known in the art.

It is known in the art that distinct species of fish respond differently during the landing process. For example, the response of a muskie on a fishing line results in a significantly more erratic experience for the angler, and the muskie imparts greater swings in applied force to the fishing line than does the response of crappie on the fishing line. Those skilled in the art know that the fight delivered by a 3 lb. muskie "baby" is greater than the fight delivered by a 3 lb. adult crappie, therefore, pound for pound, the landing force profile differs between the muskie species and the crappie species. By accommodating a separate species response formulas for each species of interest, the accuracy of predicting an estimated weight of a fish on the fishing line, prior to landing the fish, continually improves.

The process of continually improving an ability to more accurately predict the weight of a particular species on a fishing line, prior to actually landing the fish, preferably includes the following steps: the angler depresses the display activation switch 150 a predetermined number of times to select a particular species specific file, such as file D of files A–J (not separately shown), which the angler has decided, for example, to make their bluegill species specific file; the angler selects the bait or lure most likely to attract a bluegill; baits the hook or attaches the lure to the fishing line; simultaneously depresses the barometric switch 148 and the temperature switch 152 to activate the dynamic load measurement circuit 134; and commences fishing for bluegills.

When a fish strikes the lure or bait, the dynamic load measurement circuit 134 preferably collects the following information: the hook-set force; the peak force encountered while landing the fish; and the average constant force encountered while reeling the fish in. For purposes of disclosure, not by way of limitation, suppose factors of the species response formula are initially set to an attribute distribution of: $\frac{1}{3}$ of the actual weight of the landed fish to be predicted by the hook-set force; $\frac{1}{3}$ of the actual weight of the landed fish to be predicted by the peak force; and $\frac{1}{3}$ of the actual weight of the landed fish to be predicted by the average constant force. Once the fish is landed, the weight of the fish is measured by the weight measurement circuit 136 (to be discussed in greater detail below), and the actual weight of the fish is used to calibrate the species response formula.

For example, suppose the strike force registered at 12 oz., the peak force at 48 oz., and the average constant force registered at 24 oz., the estimated weight of the fish would be predicted to be 28 oz. Now suppose the actual weight of the fish was 30.6 oz. Following a depression of the display activation switch 150, the controller 138 performs a number of iterations of "best fit" calculations, and the factors in the species response formula are changed to an attribute redistribution of: 20% of the actual weight of the landed fish to be predicted by the hook-set force; 50% of the actual weight of the landed fish to be predicted by the peak force; and 30% of the actual weight of the landed fish to be predicted by the average constant force, which in this case, predicts the weight of the fish to be 30.6 oz.

As additional fish of the same species are caught, the attributes of the species response formula are adjusted in small increments to "fine tune" the species response formula, resulting in a more accurate predictive tool. As those skilled in the art will appreciate, to improve accuracy, the hook-set force; peak force; and average constant force may be modified by a compensation factor based on, for example, the amount of fishing line on the spool, prior to being operated on by the species response formula.

If however, upon landing the fish, the landed fish turns out to be a walleye rather than a bluegill, but still weighing 30.6 oz., the angler can: depress the barometric switch 148 to hold the collected force data in memory; depress the display activation switch 150 a predetermined number of times to select an alternate particular species specific file, such as file G of files A–J, (which was either the species specific file the angler had previously selected for walleyes, or is an unused file and will become the species specific file for walleyes); depress the display activation switch 150, and the controller 138 will perform a number of iterations of "best fit" calculations to update the species response formula for walleyes.

If the initial species specific formula for walleyes, had the same initial (⅓, ⅓, ⅓) distribution of factors as the bluegill species specific formula (i.e., no actual, previous walleye data available), the controller 138 would effect the attribute redistribution to be: 20% of the actual weight of the landed fish to be predicted by the hook-set force; 50% of the actual weight of the landed fish to be predicted by the peak force; and 30% of the actual weight of the landed fish to be predicted by the average constant force, which would yield the same predicted weight of the fish to be 30.6 oz.

Continuing with reference to FIGS. 4, 5, and 6, operation of the weight measurement circuit 136 occurs as follows. Upon landing a fish, the angler preferably suspends the fish from the weigh hook 114 attached to the retractable weigh line 112 of the force transfer mechanism of FIG. 2. By depressing the display activation switch 150 a predetermined number of times, the display 108 reveals a message such as, "WEIGH FISH," to the angler, and the weight measurement circuit 136 is preferably activated. With the fish suspended from the weigh hook 114, the landed fish imparts a force through the weigh hook 114, and the retractable weigh line 112, and onto the coil spring mechanism 110 of FIG. 2, of a force transfer mechanism. The imparted force preferably is applied in a direction indicated by the force vector 115 of FIG. 2. The force transfer mechanism translates the force imparted on the coil spring mechanism 110 by the suspended fish into an induced force applied in a second direction identified by force vector 154 of FIG. 5.

The induced force is preferably applied normal to the face of a force sensor 156. The force sensor 156 responds to the induced force by generating a voltage output. The controller 138 determines the weight of the fish based on the voltage level provided by the force sensor 156, i.e., the higher the voltage level—the heavier the fish. Preferably, the force sensor 156 is a load cell. As will be apparent to those skilled in the art, the load cell could be any type of force measuring device such as a strain gauge load cell, a piezo load cell, or the like.

Upon determining the weight of the fish, the controller 138 transfers the data to the display driver 144, and preferably the display driver 144 cooperates with the display 108 to provide a viewing of the weight of the fish for the angler, such as shown by FIG. 5. Additionally, the controller 138 further stores the fish weight data in the MEM 140. In a preferred embodiment, fish weight data is stored in the species specific file of the MEM 140 previously selected by the angler. The species specific file tracks the number of fish weighed, weight of the largest fish weighed, weight of the smallest fish weighed, and the average weight of all fish weighed. Upon removal of the fish from the weigh hook 114, the force sensor 156 discontinues generation of the voltage output, and the controller 138 halts execution of the fish weigh portion of the control program, and turns the display 108 off.

Preferably, once at least one fish has been individually weighed and placed in the species specific file selected by the angler, the angler may view the contents of the species specific file by depressing the display activation switch 150 a predetermined number of times until the display 108 reveals the species specific file of interest. The angler then simultaneously depresses both the barometric switch 148, and the temperature switch 152, which causes the controller 138 to retrieve the data contents of the species specific file of interest, and provide the data to the display 108 for viewing by the angler.

Continuing with FIGS. 4, 5 and 6, the electronics enclosure 128 of the watertight electronics module 106 includes a battery chamber 158 comprising a removable battery confinement member 160 and a battery access aperture 162. The removable battery confinement member 160 cooperates with the battery access aperture 162 to provide the watertight environment for a battery 164. The electronics enclosure 128 further provides a lens portion 166, a first electronics chamber 168, and a second electronics chamber 170. The lens portion 166 provides a watertight barrier for the display 108 while permitting the angler to view the display 108. The first electronics chamber 168 supports a first printed circuit board assembly (PCBA) 172, while the second electronics chamber 170 supports a second PCBA 174.

The first PCBA 172 and the second PCBA 174 are preferably brought into electrical communication by an interface cable 176. Operations of the dynamic load measurement circuit 134, the controller 138, the display driver 144, and the display 108 are each supported by the first PCBA 172. The second PCBA 174 supports operations of the barometric pressure measurement circuit 130, the temperature measurement circuit 132, and the weight measurement circuit 136. The battery 164 provides the energy for operation of all the electrical devices housed by the electronics enclosure 128 of the watertight electronics module 106. Regarding the barometric pressure measurement circuit 130, a surface mount capacitive silicon absolute pressure sensor 182 of FIG. 6, such as the KP120 by Infineon Technologies, AG of Munich, Germany has been found useful as the barometric pressure measurement circuit 130.

Figure 7:
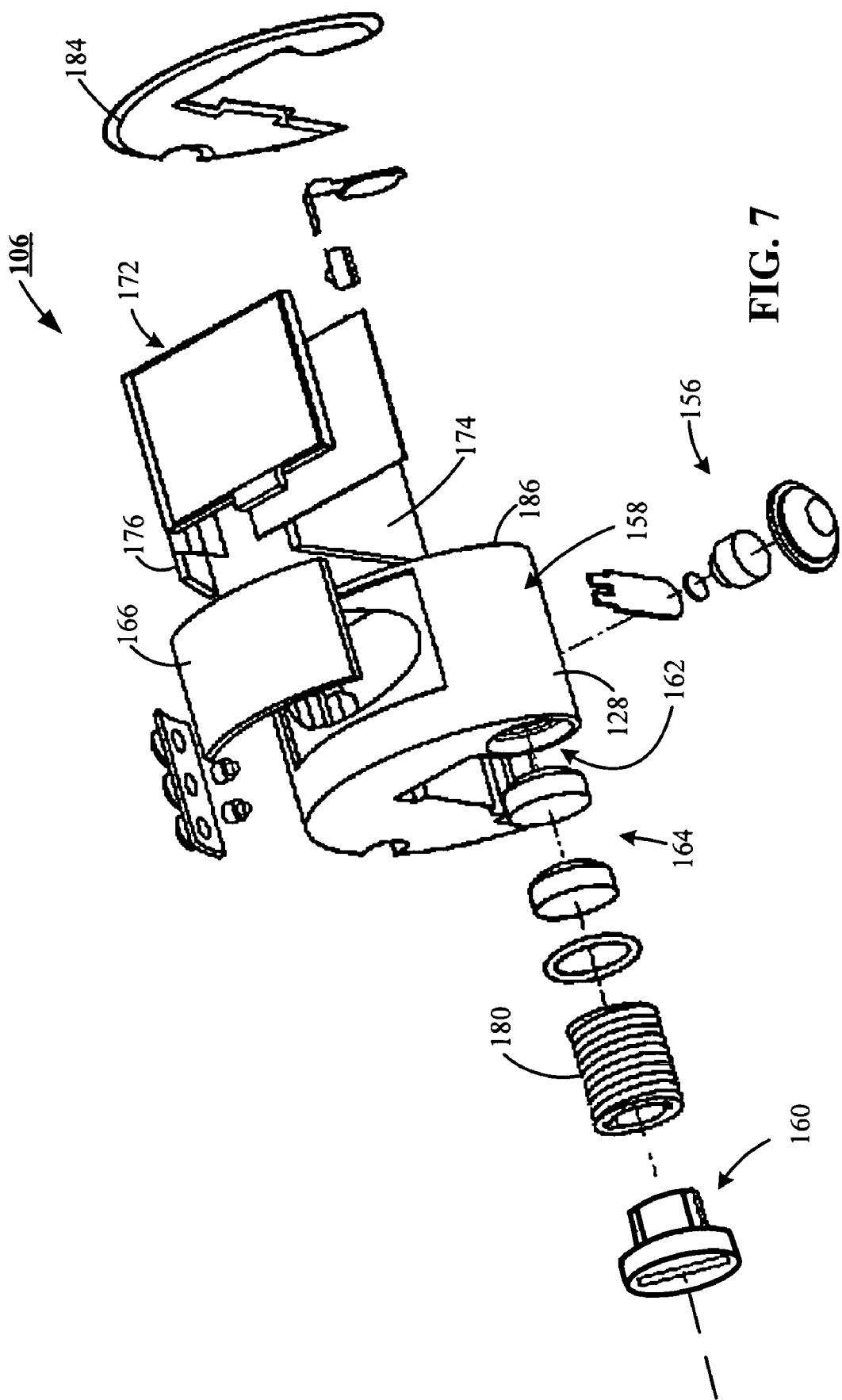
FIG. 7 provides a top perspective exploded view of the preferred embodiment of the watertight electronics module of FIG. 6.

FIG. 7 shows the battery chamber 158 further comprising a battery retention portion 180 interposed between the removable battery confinement member 160 and the battery 164, and sized to threadingly engage the battery access aperture 162. FIG. 7 further shows a seal plate 184 configured to engage a seal surface 186 of the electronics enclosure 128. Preferably, the seal plate 184 and the electronics enclosure 128 are manufactured from a common material, most preferably a polymer, and joined one to the other to form a watertight enclosure using a sealing agent configured to cooperate with the polymer.

It is noted that the design of the fishing reel 100, including the integrated watertight electronics module 106, has been particularly engineered to facilitate: serviceability of the watertight electronics module 106; ease of manufacturing the electronics enclosure 128; upgradeability of the first PCBA 172 and the second PCBA 174; and an ability to support character reels with additional circuits and programs that enhance the fishing experience by providing selected, special audio and visual effects for the angler.

FIG. 8 depicts a proportional graphical representation 188 of barometric pressure readings of a preferred embodiment, provided by the display 108. The data displayed are generated from a plurality of barometric pressure readings, collected over time at a predetermined rate. Preferably, the representation is a proportional graphical representation of the barometric pressure readings, rather than an actual representation of the barometric pressure readings, because knowledge of a change in barometric pressure and the direction of the change in barometric pressure are data of greater use to an angler than is the actual barometric pressure.

Further shown by FIG. 8, in partial cutaway, is a boss 190 that extends rearward from a rear face 192 of a fishing line spool ("spool") 194, and a stop 196 extending from a frame 198 of the fishing reel 100. Interposed between the boss 190 and the stop 196 is a load cell 200. In a preferred operation of the fishing reel 100, the boss 190 interacts with the stop 196 to prevent rotation of the spool 194 in response to placement of a load on a fishing line 202 supported by the spool 194. Preferably, the load cell 200, working in conjunction with the boss 190 and the stop 196 to prevent rotation of spool 194, responds to the load imparted on the fishing line 202 by producing a voltage response with a voltage amplitude proportional to the mass of the load imparted on the fishing line 202.

It should be noted that, in a spin cast fishing reel, the spool normally does not rotate, although in some reels, the spool may rotate as part of the drag system. For non-rotating spin cast fishing reels, such as 100, winding and unwinding are controlled by the spinner head (not separately shown). When an outward force is applied to the fishing line 202, reverse rotation of spinner head is prevented by the anti-reverse mechanism to further prevent unwinding of the fishing line 202. Thus, such outward force will apply torque to the spool 194, thereby urging rotation of the spool 194. Such rotation, however, is prevented by the interaction of the boss 190 working in conjunction with the stop 196. The force applied by the boss 190 on the stop 196 will be proportional to the tension on the fishing line 202, thus allowing measurement of such tension with the load cell 200.

FIG. 9 illustrates a proportional graphical representation 204 of water temperature readings of a preferred embodiment, provided by the display 108. The data displayed are generated from a plurality of water temperature readings, collected over time, typically at a random rate. Preferably, the representation is a proportional graphical representation of the water temperature readings, rather than an actual representation of the water temperature readings, because knowledge of a change in the temperature of the water and the direction of the change in water temperature are of at least equal use to an angler as the actual water temperature. For example, the profile of the graphical representation 204 of water temperature readings may aid the angler in identifying location of springs in spring fed lakes. FIG. 9 further shows an alternate preferred embodiment of the fishing reel 100, which provides the barometric switch 148, the display activation switch 150 and the temperature switch 152 positioned around the periphery of the display 108.

Figure 10:
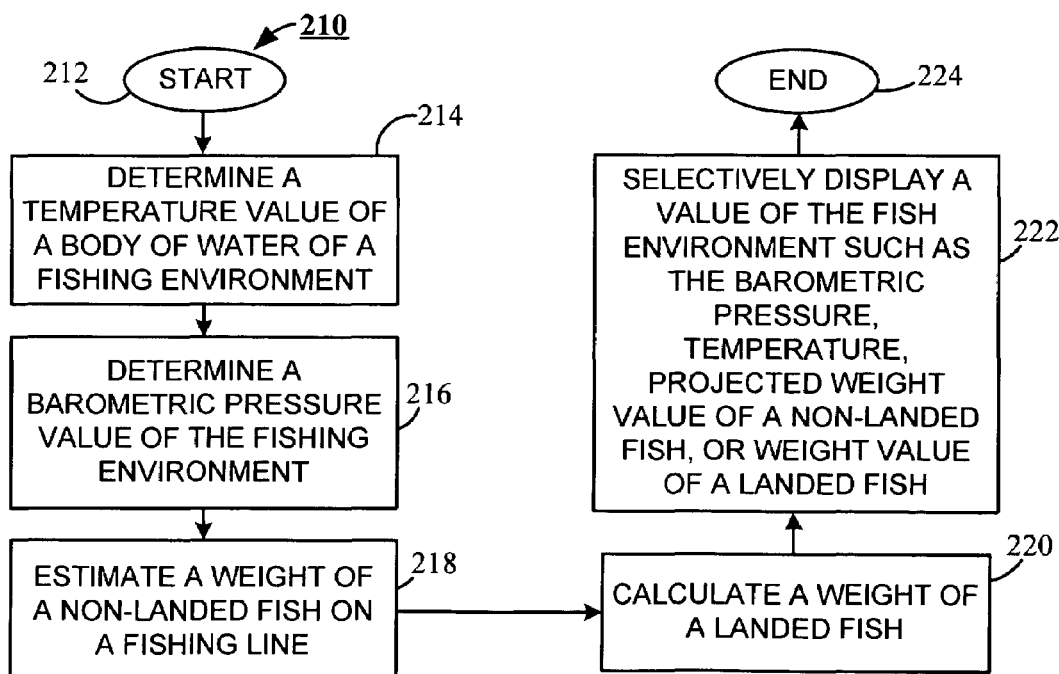
FIG. 10 provides a flow chart of a method of using the inventive fishing reel of FIG. 1.

The flow diagram of FIG. 10 shows a process 210 for using a fishing reel, such as 100, commences at start process step 212 and proceeds to process step 214. At process step 214 determining a temperature value of a body of water of a fishing environment based on a response of a thermal-couple, such as 120, communicating with a temperature measurement circuit, such as 132 of an electronics module, such as 106, wherein the electronics module is enclosed by an exterior housing, such as 102, of a fishing reel, such as 100. At process step 216, a barometric pressure value of the fishing environment is determined based on the response of a barometric pressure measurement circuit, such as 130, of the electronics module to a sample of the atmosphere of the fishing environment.

At process step 218, a projected weight value of a fish interacting with a fishing line, such as 202, of the fishing reel based on a change in load applied to the fishing line by a fish while the fish is being reeled in, wherein a change in load applied to the fishing line is analyzed by a dynamic load measurement circuit, such as 134, of the electronics module.

At process step 220, a weight value of a landed fish is calculated by a controller, such as 138, based on a response of a weight measurement circuit, such as 136, of the electronics module responding to suspension of the landed fish on a weigh hook, such as 114, attached to a retractable weigh line, such as 112, communicating with the weight measurement circuit.

At process step 222, a value is selectively displayed on a display, such as 108, of the electronics module, wherein the value is the temperature value, the barometric pressure value, the projected weight value, or the weight value. Upon removal of the fish from the weigh hook, the load cell discontinues generation of the voltage output, and the controller halts execution of a fish weigh portion of the control program, and turns the display off. The process 210 concludes at end process step 224.

It is noted that, in a preferred embodiment, that a simultaneous depression of the barometric switch 148, the display activation switch 150 and the temperature switch 152, of FIG. 5: shuts down operations of the circuits housed by the electronics enclosure 128, of FIG. 5; clears the MEM 140 of the collected barometric pressure data, temperature data, and fish weight data; but preserves the species response formula in the MEM 140 for future use and refinement.

Thus, the present invention is well adapted to carry out the advantages mentioned above as well as those inherent therein. While presently preferred embodiments have been described for purposes of this disclosure, numerous changes and modifications will be apparent to those skilled in the art. For example, the electronics module may be used to house circuitry related to controlling reel functions, such as electronic drag control. Such changes and modifications are encompassed within the spirit of this invention as defined by the appended claims. Furthermore, while the preferred embodiment of the inventive device is described hereinabove and depicted in the accompanying figures as incorporated in a spin cast reel, the invention is not so limited. The inventive device is equally suitable for use in bait cast fishing reels and spinning reels, as well as any other type of reel.

What is claimed is:

1. A method by steps comprising:
attaching a thermal-couple to a fishing reel;
immersing the thermal-couple into a body of water of a fishing environment;
determining a temperature value of the body of water based on a response of the thermal-couple to the body of water;
providing a visual representation of the determined temperature value on a display of the fishing reel;
activating a barometric pressure measurement circuit of an electronics module enclosed by an exterior housing of the fishing reel;
sampling an atmospheric pressure of the fishing environment;
determining a barometric pressure value of the fishing environment based on the atmospheric pressure sample; and
providing a visual representation of the determined barometric pressure value on the display of the fishing reel.

2. The method of claim 1, by steps further comprising:
activating a dynamic load measurement circuit of the electronics module in response to a change in load on a fishing line of the fishing reel, the change in load caused by a fish interacting with the fishing line;
calculating an estimated weight of the fish interacting with the fishing line based on a response of the dynamic load measurement circuit responding to the change in load on the fishing line while the fish is being reeled in;

providing a visual representation of the calculated weight of the fish on the display of the fishing reel, while the fish is being reeled in.

3. The method of claim 2, by steps further comprising:

activating a weight measurement circuit of the electronics module by suspending a landed fish from a weigh hook communicating with the weight measurement circuit;

calculating a weight value of the suspended fish based on a response of the weight measurement circuit to the suspended fish;

providing a visual representation of the calculated weight value of the landed fish on the display of the fishing reel; and wherein the response of the thermal-couple is interpreted by a temperature measurement circuit of the electronics module, and further wherein the display of the fishing reel is provided by the electronics module.

4. A combination comprising:

an exterior housing of a fishing reel; and an electronics module enclosed by the exterior housing, in which the electronics module provides a watertight environment for a plurality of circuits used for determining a status of a fishing environment by steps for determining the status of the fishing environment; wherein said steps comprise:

determining a temperature value of a body of water of the fishing environment based on a response of a thermal-couple communicating with a temperature measurement circuit of an electronics module, wherein the electronics module is enclosed by the exterior housing of the fishing reel;

determining a barometric pressure value of the fishing environment based on the response of a barometric pressure measurement circuit of the electronics module to a sample of the atmosphere of the fishing environment;

estimating a projected weight value of the fish interacting with a fishing line of the fishing reel based on a change in load applied to the fishing line by a fish while the fish is being reeled in, wherein a change in load applied to the fishing line is analyzed by a dynamic load measurement circuit of the electronics module;

calculating a weight value of a landed fish based on a response of a weight measurement circuit of the electronics module responding to a suspension of the landed fish from a weigh hook attached to a retractable weigh line communicating with the weight measurement circuit; and selectively displaying a value, wherein the value is the temperature value, the barometric pressure value, the projected weight value, or the weight value on a display of the electronics module.

5. A method of determining temperature of a body of water in a fishing environment comprising:

affixing a flexible length of connector to a fishing reel wherein said flexible length of connector has a thermal probe affixed to a distal end;

maintaining said fishing reel and attached fishing rod in a non-water environment;

dangling said thermal probe into the body of water on said flexible length of connector;

determining a temperature value of the body of water based on communications from said thermal probe; and providing a visual representation of said temperature value on a display of said fishing reel.

6. The method according to claim 5 further comprising the step of:

opening a thermal-couple receptacle on said fishing reel for receiving a first end of flexible length of connector.

7. A method by steps comprising:

activating a barometric pressure measurement circuit of an electronics module enclosed by an exterior housing of the fishing reel;

sampling an atmospheric pressure of the fishing environment;

determining a barometric pressure value of the fishing environment based on the atmospheric pressure sample; and providing a visual representation of the determined barometric pressure value on the display of the fishing reel.

8. A method by steps comprising:

activating a dynamic load measurement circuit of the electronics module in response to a change in load on a fishing line of the fishing reel, the change in load caused by a fish interacting with the fishing line;

calculating an estimated weight of the fish interacting with the fishing line based on a response of the dynamic load measurement circuit responding to the change in load on the fishing line while the fish is being reeled in;

providing a visual representation of the calculated weight of the fish on the display of the fishing reel, while the fish is being reeled in.

9. A fishing reel comprising an exterior housing enclosing an electronics enclosure, said electronics enclosure including a watertight casing in which is disposed at least one circuit in which the electronics enclosure flasher houses a barometric pressure measurement circuit, a temperature measurement circuit, and a controller, wherein the controller communicates with the dynamic load measurement circuit to calculate an estimated weight value of the fish while the fish is being reeled in.

10. A fishing reel comprising:

an exterior housing enclosing an electronics enclosure, said electronics enclosure including a watertight casing in which is disposed a dynamic load measurement circuit for use in estimating a weight of a fish while the fish is being reeled in; and a weight measurement circuit for measuring the weight of the fish after the fish has been landed.

11. The fishing reel of claim 10, in which the electronics enclosure provides a watertight environment for the dynamic load measurement circuit and the weight measurement circuit.

12. The fishing reel of claim 11, in which the electronics enclosure further provides a watertight environment for a barometric pressure measurement circuit and temperature measurement circuit.

13. The fishing reel of claim 10, in which the electronics enclosure further houses a controller communicating with the dynamic load measurement circuit and the weight measurement circuit, wherein the electronics enclosure provides a watertight environment for the controller, the dynamic load measurement circuit, and the weight measurement circuit.

14. The fishing reel claim 12, in which the electronics enclosure further provides a watertight environment for a controller, the controller communicating with the barometric pressure measurement circuit, the temperature measurement circuit, weight measurement circuit, and the dynamic load measurement circuit.

15. The fishing reel of claim 10, in which the electronics enclosure further houses a barometric pressure measurement circuit, a temperature measurement circuit, and a controller, wherein the controller communicates with the dynamic load measurement circuit to calculate an estimated weight value of the fish while the fish is being reeled in.

16. The fishing reel of claim 15, in which the controller communicates with the weight measurement circuit to calculate a weight value of the fish after the fish has been landed.

17. The fishing reel of claim 16, in which the controller communicates with the barometric pressure measurement circuit to calculate a current barometric pressure value of a fishing environment.

18. The fishing reel of claim 17, in which the controller communicates with the temperature measurement circuit to calculate a temperature value of a body of water of the fishing environment.

19. The fishing reel of claim 18, in which the exterior housing supports a display with a display driver, the display driver communicating with the controller to translate data provided by the controller into information visually presented to a user by the display.

20. The fishing reel of claim 19, in which the electronics enclosure further houses a power source, wherein the power source provides energy for operation of the dynamic load measurement circuit, the weight measurement circuit, the barometric pressure measurement circuit, the temperature measurement circuit, the display with the display driver, and the controller.

21. The fishing reel of claim 20, in which the electronics enclosure provides a watertight environment for the power source, the controller, the display with the display driver, the temperature measurement circuit, the barometric pressure measurement circuit, the weight measurement circuit, in the dynamic load measurement circuit.

22. The fishing reel of claim 21, in which the power source is a battery, and in which the electronics enclosure comprises a battery chamber, wherein the battery chamber comprises a removable battery confinement member and a battery access aperture, and in which the battery confinement member cooperates with the battery access aperture to provide the watertight environment for the battery.

23. The fishing reel of claim 22, in which the exterior housing is an exterior housing of a fishing reel.

* * * * *

UNITED STATES PATENT AND TRADEMARK OFFICE
CERTIFICATE OF CORRECTION

PATENT NO.         : 7,225,102 B2                                           Page 1 of 1
APPLICATION NO. : 10/988171
DATED              : May 29, 2007
INVENTOR(S)        : Stiner et al.

It is certified that error appears in the above-identified patent and that said Letters Patent is hereby corrected as shown below:

Col. 12, line 31 the words "circuit in which the electronics enclosure flasher houses a"

should read --circuit in which the electronics enclosure further houses a --

Signed and Sealed this

Seventh Day of August, 2007

JON W. DUDAS
*Director of the United States Patent and Trademark Office*